(12) United States Patent
Kamei

(10) Patent No.: US 11,408,476 B2
(45) Date of Patent: Aug. 9, 2022

(54) FRICTION MATERIAL

(71) Applicant: TUNGALOY CORPORATION, Fukushima (JP)

(72) Inventor: Mitsuo Kamei, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 351 days.

(21) Appl. No.: 16/776,483

(22) Filed: Jan. 29, 2020

(65) Prior Publication Data

US 2020/0309221 A1 Oct. 1, 2020

(30) Foreign Application Priority Data

Mar. 26, 2019 (JP) .............................. JP2019-059114

(51) Int. Cl.
*F16D 69/02* (2006.01)
*B32B 15/01* (2006.01)
(Continued)

(52) U.S. Cl.
CPC ............ *F16D 69/027* (2013.01); *B32B 15/01* (2013.01); *B32B 15/011* (2013.01);
(Continued)

(58) Field of Classification Search
CPC .............. F16C 2240/60; F16C 2204/10; F16C 2204/52; F16C 2204/60; F16C 33/121; F16C 33/125; F16C 2300/02; F16C 2300/42; F16D 69/027; F16D 2069/005; B32B 15/01; B32B 15/013; B32B 15/015; B32B 15/011; B32B 15/04; B32B 15/043; B32B 15/18; B32B 15/20; C22C 18/00; C22C 18/02; C22C 9/06; C22C 9/00; C22C 19/03; C22C 19/002; C22C 19/058; C22C 38/002; C22C 38/02; C22C 38/04; C22C 38/08; C22C 38/16; C22C 13/00; C23C 28/021; C23C 28/027; C23C 28/028; C23C 28/023; C23C 28/30; C23C 28/321; C23C 28/325; C23C 28/36; C23C 30/00; C23C 30/005; Y10T 428/12458; Y10T 428/12493; Y10T 428/12951; Y10T 428/12958; Y10T 428/12972; Y10T 428/12993; Y10T 428/12937; Y10T 428/12931; Y10T 428/12882;
(Continued)

(56) References Cited

U.S. PATENT DOCUMENTS 5,298,336 A * 3/1994 Tanaka .................. F16C 33/122
428/548

FOREIGN PATENT DOCUMENTS

JP 2002-031177 A 1/2002

* cited by examiner

*Primary Examiner* — Michael E. La Villa
(74) *Attorney, Agent, or Firm* — Studebaker & Brackett PC

(57) ABSTRACT

A friction material comprises an Fe part which contains Fe as a main component, a coating layer formed on a surface of the Fe part, and a friction part formed on a surface of at least a part of the coating layer, and the coating layer comprises a first coating layer and a second coating layer which have a specific average thickness and a specific component in order from Fe part side, and in the second coating layer, in order of positions at which the thickness is 20%, 40%, 60% and 80% of the second coating layer from the side of the first coating layer to the side opposite thereto, a Cu content increases and a Ni content decreases.

20 Claims, 1 Drawing Sheet

(51) Int. Cl.
| | |
|---|---|
| B32B 15/04 | (2006.01) |
| C22C 13/00 | (2006.01) |
| C22C 18/00 | (2006.01) |
| C23C 28/00 | (2006.01) |
| C22C 9/06 | (2006.01) |
| C22C 19/05 | (2006.01) |
| C22C 38/02 | (2006.01) |
| C22C 38/00 | (2006.01) |
| C22C 19/00 | (2006.01) |
| C22C 19/03 | (2006.01) |
| C22C 38/04 | (2006.01) |
| C22C 38/08 | (2006.01) |
| C22C 38/16 | (2006.01) |
| C23C 28/02 | (2006.01) |
| F16C 33/12 | (2006.01) |
| C23C 30/00 | (2006.01) |
| B32B 15/20 | (2006.01) |
| C22C 18/02 | (2006.01) |
| C22C 9/00 | (2006.01) |
| B32B 15/18 | (2006.01) |
| F16D 69/00 | (2006.01) |

(52) U.S. Cl.
CPC .......... *B32B 15/013* (2013.01); *B32B 15/015* (2013.01); *B32B 15/04* (2013.01); *B32B 15/043* (2013.01); *B32B 15/18* (2013.01); *B32B 15/20* (2013.01); *C22C 9/00* (2013.01); *C22C 9/06* (2013.01); *C22C 13/00* (2013.01); *C22C 18/00* (2013.01); *C22C 18/02* (2013.01); *C22C 19/002* (2013.01); *C22C 19/03* (2013.01); *C22C 19/058* (2013.01); *C22C 38/002* (2013.01); *C22C 38/02* (2013.01); *C22C 38/04* (2013.01); *C22C 38/08* (2013.01); *C22C 38/16* (2013.01); *C23C 28/021* (2013.01); *C23C 28/023* (2013.01); *C23C 28/027* (2013.01); *C23C 28/028* (2013.01); *C23C 28/30* (2013.01); *C23C 28/321* (2013.01); *C23C 28/325* (2013.01); *C23C 28/36* (2013.01); *C23C 30/00* (2013.01); *C23C 30/005* (2013.01); *F16C 33/121* (2013.01); *F16C 33/125* (2013.01); *F16C 2204/10* (2013.01); *F16C 2204/52* (2013.01); *F16C 2204/60* (2013.01); *F16C 2240/60* (2013.01); *F16C 2300/02* (2013.01); *F16C 2300/42* (2013.01); *F16D 2069/005* (2013.01); *Y10T 428/1291* (2015.01); *Y10T 428/12458* (2015.01); *Y10T 428/12493* (2015.01); *Y10T 428/12882* (2015.01); *Y10T 428/12903* (2015.01); *Y10T 428/12917* (2015.01); *Y10T 428/12924* (2015.01); *Y10T 428/12931* (2015.01); *Y10T 428/12937* (2015.01); *Y10T 428/12951* (2015.01); *Y10T 428/12958* (2015.01); *Y10T 428/12972* (2015.01); *Y10T 428/12993* (2015.01); *Y10T 428/2495* (2015.01); *Y10T 428/24959* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(58) Field of Classification Search
CPC ....... Y10T 428/1291; Y10T 428/12903; Y10T 428/12924; Y10T 428/12917; Y10T 428/2495; Y10T 428/24959; Y10T 428/24967; Y10T 428/26; Y10T 428/263; Y10T 428/264; Y10T 428/265
See application file for complete search history.

FRICTION MATERIAL

TECHNICAL FIELD

The present invention relates to a friction material.

BACKGROUND ART

A friction material is used for means for controlling, as desired, rotation or movement of various types of machines such as machine tools, construction machinery, agricultural machinery, automobiles, two-wheeled vehicles, trains, aircrafts, and ships; namely clutches or brakes.

As such a friction material, for example, Patent Publication JP-A-2002-31177 describes a sintered material superior in rust-prevention, made by diffusion bonding of a metallic lining material to an iron back plate via copper coating through sintering, wherein coating of nickel, chromium, or nickel-chromium is laid between the surface of the back plate and the copper coating.

SUMMARY

Technical Problem

A conventional friction material that is made by sintering-bonding a friction part to a back plate (for example, a steel material) via copper plating has inferior corrosion resistance because there are many pinholes formed in the plating in sintering. When such a friction material is used as, for example, a brake pad, water containing salt derived from a snow melting agent (calcium chloride) or seawater (sodium chloride) enters from the pinholes while a vehicle is running, to corrode the back plate. As the corrosion of the back plate progresses, rust gathered by the interface between the back plate and the plating eats deeply, which leads to a decline in bonding strength of the back plate and the friction part, and finally, a problem to such an extent that the friction part peels from the back plate.

In such a friction material, generally, copper plating of not less than 30 μm in coating thickness is necessary for filling the pinholes to improve the corrosion resistance. However, forming plating of not less than 30 μm in coating thickness by electroplating causes products to have a wide variation of coating thickness, which may lead to faulty products in dimension. Further, this makes the plating time longer, which leads to increase in costs. In addition, an excessively thick layer of plating may cause peeling thereof.

The present invention has been made in light of the above circumstances, and an object of the present invention is to provide a friction material superior in corrosion resistance, and superior in adhesion of a back plate and a friction part.

Solution to Problem

The present inventor has conducted studies regarding a friction material and has then found that bonding a back plate and a friction part in a friction material via a specific coating layer may give the friction material superior in corrosion resistance, and superior in adhesion of the back plate and the friction part, and this has led to the completion of the present invention.

That is, the summary of the present invention is as follows:

[1]
A friction material comprising a Fe part which contains Fe as a main component; a coating layer formed over a surface of the Fe part; and a friction part formed on a surface of at least a part of the coating layer, wherein:
the coating layer comprises a first coating layer and a second coating layer in order from Fe part side,
the first coating layer is constituted of an alloy containing Cu, Ni and Fe such that Fe content be not less than 10 atom %,
the second coating layer is constituted of an alloy containing Cu and Ni, or an alloy containing Cu, Ni and Fe such that Fe content be less than 10 atom %,
in the second coating layer, in order of positions at which the thickness is 20%, 40%, 60% and 80% of the second coating layer from the side of the first coating layer to the side opposite thereto, a Cu content increases and a Ni content decreases;
an average thickness of the first coating layer is not less than 1.0 μm and not more than 6.0 μm; and
an average thickness of the second coating layer is not less than 9.5 μm and not more than 24.0 μm.

[2]
The friction material according to [1], wherein the first coating layer contains not less than 1 atom % and not more than 45 atom % of Cu, not less than 1 atom % and not more than 45 atom % of Ni, and not less than 10 atom % and not more than 95 atom % of Fe.

[3]
The friction material according to [1] or [2], wherein the second coating layer contains not less than 5 atom % and not more than 60 atom % of Cu, not less than 40 atom % and not more than 95 atom % of Ni, and not less than 0 atom % and less than 10 atom % of Fe.

[4]
The friction material according to any one of [1] to [3], wherein, in the second coating layer, from the side of the first coating layer to the side opposite thereto, in three sections comprising a section from the position at which the thickness is 20% of the second coating layer to the position at which the thickness is 40% of the second coating layer, a section from the position at which the thickness is 40% of the second coating layer to the position at which the thickness is 60% of the second coating layer, and a section from the position at which the thickness is 60% of the second coating layer to the position at which the thickness is 80% of the second coating layer, a rate of the Cu content increased and a rate of the Ni content decreased are each within 20 atom %.

[5]
The friction material according to any one of [1] to [4], wherein:
the coating layer comprises a third coating layer formed on a surface of the second coating layer, the surface being opposite to the Fe part,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

[6]
The friction material according to [5], wherein the third coating layer contains not less than 30 atom % and not more than 69.5 atom % of Cu, not less than 30 atom % and not more than 69.5 atom % of Ni, and not less than 0.5 atom % and not more than 6 atom % of Sn and/or Zn.

[7]
The friction material according to any one of [1] to [6], wherein an average thickness of the coating layer is not less than 10.5 μm and less than 30.0 μm.

Advantageous Effects of Invention

The present invention may provide a friction material superior in corrosion resistance, and superior in adhesion of a back plate and a friction part.

DESCRIPTION OF EMBODIMENTS

Figure 1:
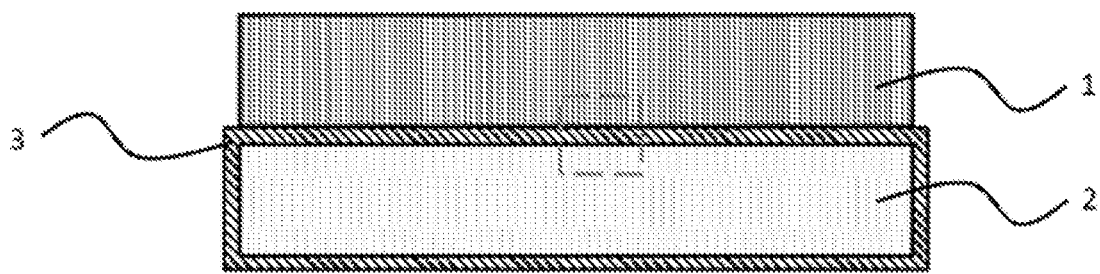
FIG. 1 is a schematic cross-sectional view illustrating one example of the friction material of the present invention.

An embodiment for carrying out the present invention (hereinafter simply referred to as the "present embodiment") will hereinafter be described in detail, with reference to the attached drawings as appropriate. However, the present invention is not limited to the present embodiment below. Various modifications may be made to the present invention without departing from the gist of the invention. In the drawings, unless otherwise specified, positional relationships, such as vertical and horizontal relationships, are based on the positional relationships shown in the drawings. Further, the dimensional ratios of the drawings are not limited to those shown therein.

The friction material of the present embodiment includes a Fe part which contains Fe as the main component, a coating layer formed over a surface of the Fe part, and a friction part formed on a surface of at least a part of the coating layer; the coating layer includes a first coating layer and a second coating layer in order from the Fe part side; the first coating layer is constituted of an alloy containing Cu, Ni and Fe such that Fe content be not less than 10 atom %; the second coating layer is constituted of an alloy containing Cu and Ni, or an alloy containing Cu, Ni and Fe such that Fe content be less than 10 atom %; in the second coating layer, in order of positions at which the thickness is 20%, 40%, 60% and 80% of the second coating layer from the side of the first coating layer to the side opposite thereto, a Cu content increases and a Ni content decreases; an average thickness of the first coating layer is not less than 1.0 µm and not more than 6.0 µm; and an average thickness of the second coating layer is not less than 9.5 µm and not more than 24.0 µm.

The friction material of the present embodiment comprises the above-described configurations, and thereby is superior in corrosion resistance, and superior in adhesion of the Fe part, which is a back plate, and the friction part. The factors for the improvements of the corrosion resistance and adhesion of the friction material of the present embodiment can be considered to be as set forth as follows. However, the present invention is not in any way limited by the factors set forth below.

The friction material of the present embodiment includes the Fe part which contains Fe as the main component, the coating layer formed over the surface of the Fe part, and the friction part formed on the surface of at least a part of the coating layer. In the present embodiment, "the main component is Fe" means that the Fe part contains not less than 50 mass % of Fe. This makes it possible to sufficiently diffuse Fe into the first coating layer when the coating layer is formed over the surface of the Fe part. The friction material of the present embodiment includes, as a coating layer, the first coating layer and the second coating layer in order from the Fe part side, which makes it possible to prevent pinholes that can be formed in the coating layer from piercing through the Fe part, as a result to improve the corrosion resistance. In the friction material of the present embodiment, the first coating layer is constituted of an alloy containing Cu, Ni and Fe such that Fe content be not less than 10 atom %, which improves the adhesion of the Fe part and the coating layer. In the friction material of the present embodiment, the second coating layer is constituted of an alloy containing Cu and Ni, or an alloy containing Cu, Ni and Fe such that Fe content be less than 10 atom %, which may suppress rust generation, to improve the corrosion resistance. In the friction material of the present embodiment, the first coating layer has an average thickness of not less than 1.0 µm, which improves the adhesion of the Fe part and the coating layer; and the first coating layer has an average thickness of not more than 6.0 µm, and the layer containing at least a specific amount of Fe is not too thick, which improve the corrosion resistance. In the friction material of the present embodiment, the second coating layer has an average thickness of not less than 9.5 µm, which improves the corrosion resistance, and the second coating layer has an average thickness of not more than 24.0 µm, which may lead to uniform formation of the coating layer. In addition, in the friction material of the present embodiment, in the second coating layer in order of positions at which the thickness is 20%, 40%, 60% and 80% of the second coating layer from the side of the first coating layer to the side opposite thereto, the Cu content increases, and the Ni content decreases. With this, in the second coating layer on the side of the first coating layer, since the Ni content increases, corrosion resistance is improved, and on the surface (the surface opposite to the first coating layer) of the second coating layer, adhesion to the friction part or adhesion to a third coating layer is improved. This is considered to be caused by the fact that, when the Cu content increases toward the surface (the surface opposite to the first coating layer) of the second coating layer, since the Ni content relatively decreases, it is possible to prevent the hardness of the second coating layer from being too great. In addition, in the second coating layer, when the Cu content increases and the Ni content decreases in order of positions at which the thickness is 20%, 40%, 60% and 80% of the second coating layer from the side of the first coating layer to the side opposite thereto, it is possible to prevent pinholes from being connected to the Fe part. As a result, the friction material of the present embodiment has improved corrosion resistance. In addition, in the friction material of the present embodiment, when a gradient of the Cu content and Ni content imparted to the second coating layer in this manner, it is possible to prevent, for example, residual stress generated inside the plating from increasing, and thereby a crack generation rate is reduced, and as a result, corrosion resistance is improved.

The combination of the above configurations allows for the friction material of the present embodiment to be superior in corrosion resistance, and superior in adhesion of the Fe part, which is a back plate, and the friction part.

Figure 2:
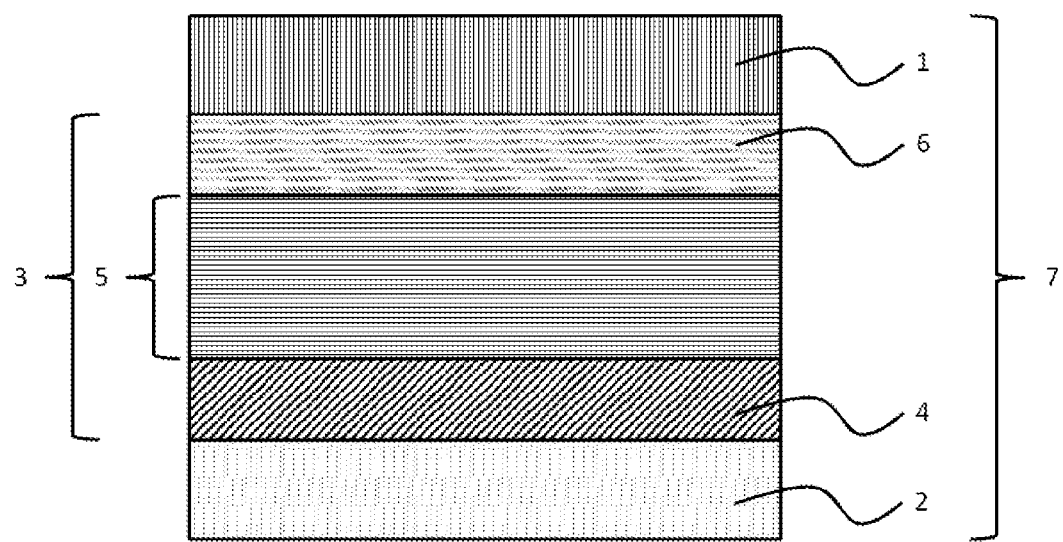
FIG. 2 is an enlarged schematic cross-sectional view of a portion surrounded by the dotted lines in the friction material in FIG. 1.

FIG. 1 is a schematic cross-sectional view illustrating one example of the friction material of the present embodiment. The friction material in FIG. 1 includes an Fe part 2 which contains Fe as the main component, a coating layer 3 formed over the surface of the Fe part 2, and a friction part 1 formed over the surface of at least a part of the coating layer. FIG. 2 is an enlarged schematic cross-sectional view of a portion surrounded by the dotted lines in the friction material in FIG. 1. In a friction material 7 in FIG. 2, the coating layer 3 includes a first coating layer 4, a second coating layer 5, and a third coating layer 6 in order from the Fe part 2 side, and the friction part 1 is formed on the surface of the third coating layer. Here, no third coating layer may be formed.

Coating Layer

The coating layer used in the present embodiment includes the first coating layer and the second coating layer in order from the Fe part side. The coating layer used in the present embodiment including the first coating layer and the second coating layer may prevent pinholes from piercing through the Fe part. As a result, the corrosion resistance of the friction material of the present embodiment improves.

The average thickness of the coating layer is preferably not less than 10.5 μm and less than 30.0 μm. When the average thickness of the coating layer is not less than 10.5 μm, the corrosion resistance of the friction material of the present embodiment tends to further improve. When the average thickness of the coating layer is less than 30.0 μm, coating layers tend to have a small variation of average thickness to improve dimensional accuracy, peeling of the coating layer tends to be suppressible, and further the plating time may be shortened to result in low cost, as for the friction material of the present embodiment. From the same point of view, the average thickness of the coating layer is more preferably not less than 13.0 μm and not more than 29.5 μm and further preferably not less than 15.4 μm and not more than 28.7 μm.

First Coating Layer

The first coating layer used in the present embodiment is constituted of an alloy containing Cu, Ni and Fe such that Fe content be not less than 10 atom %. In the first coating layer, the Cu content is preferably not less than 1 atom % and not more than 45 atom %, the Ni content is preferably not less than 1 atom % and not more than 45 atom %, and the Fe content is preferably not less than 10 atom % and not more than 95 atom %. In the friction material of the present embodiment, the first coating layer containing not less than 1 atom % of Cu tends to prevent the hardness of the first coating layer from being higher, to improve the adhesion of the Fe part and the first coating layer; the first coating layer containing not more than 45 atom % of Cu tends to suppress decrease of the Ni content rate, to improve the corrosion resistance. In the friction material of the present embodiment, the first coating layer containing not less than 1 atom % of Ni tends to improve the corrosion resistance; and the first coating layer containing not more than 45 atom % of Ni tends to prevent the hardness of the first coating layer from being higher, to improve the adhesion of the Fe part and the first coating layer. In the friction material of the present embodiment, the first coating layer containing not less than 10 atom % of Fe improves the adhesion of the Fe part and the coating layer; and the first coating layer containing not more than 95 atom % of Fe tends to improve the adhesion of the first coating layer and the second coating layer. From the same point of view, the Cu content in the first coating layer is more preferably not less than 5 atom % and not more than 45 atom %, further preferably not less than 10 atom % and not more than 45 atom %, and particularly preferably not less than 17 atom % and not more than 42 atom %; the Ni content in the first coating layer is more preferably not less than 4 atom % and not more than 43 atom %, and further preferably not less than 7 atom % and not more than 40 atom %; and the Fe content in the first coating layer is more preferably not less than 12 atom % and not more than 90 atom %, further preferably not less than 15 atom % and not more than 80 atom %, and particularly preferably not less than 18 atom % and not more than 71 atom %.

The average thickness of the first coating layer used in the present embodiment is not less than 1.0 μm and not more than 6.0 μm. In the friction material of the present embodiment, when the first coating layer has an average thickness of not less than 1.0 μm, this leads to improved adhesion of the Fe part and the coating layer; and when the first coating layer has an average thickness of not more than 6.0 μm, and the layer containing at least a specific amount of Fe is not too thick, this leads to improved corrosion resistance. From the same point of view, the average thickness of the first coating layer is preferably not less than 1.5 μm and not more than 5.9 μm, and more preferably not less than 1.8 μm and not more than 5.8 μm.

Second Coating Layer

The second coating layer used in the present embodiment is constituted of an alloy containing Cu and Ni, or an alloy containing Cu, Ni and Fe such that Fe content be less than 10 atom %. In the second coating layer, the Cu content is preferably not less than 5 atom % and not more than 60 atom %, the Ni content is preferably not less than 40 atom % and not more than 95 atom %, and the Fe content is preferably not less than 0 atom % and less than 10 atom %. In the friction material of the present embodiment, the second coating layer containing not less than 5 atom % of Cu tends to prevent the hardness of the second coating layer from being higher, to improve adhesion; the second coating layer containing not more than 60 atom % of Cu tends to suppress decrease of the Ni content rate, to improve the corrosion resistance. In the friction material of the present embodiment, the second coating layer containing not less than 40 atom % of Ni tends to improve the corrosion resistance; and the second coating layer containing not more than 95 atom % of Ni tends to prevent the hardness of the second coating layer from being higher, to improve adhesion. In the friction material of the present embodiment, the second coating layer containing less than 10 atom % of Fe may suppress rust generation, to improve the corrosion resistance. From the same point of view, the Cu content in the second coating layer is more preferably not less than 6 atom % and not more than 58 atom %, further preferably not less than 7 atom % and not more than 57 atom %, and particularly preferably not less than 8 atom % and not more than 56 atom %; the Ni content in the second coating layer is more preferably not less than 42 atom % and not more than 94 atom %, further preferably not less than 43 atom % and not more than 92 atom %, and particularly preferably not less than 44 atom % and not more than 90 atom %; and the Fe content in the second coating layer is more preferably not less than 0 atom % and not more than 9 atom %, further preferably not less than 0 atom % and not more than 8 atom %.

The average thickness of the second coating layer used in the present embodiment is not less than 9.5 μm and not more than 24.0 μm. In the friction material of the present embodiment, when the second coating layer has an average thickness of not less than 9.5 μm, this leads to improved corrosion resistance, and when the second coating layer has an average thickness of not more than 24.0 μm, this leads to uniform formation of the coating layer. From the same point of view, the average thickness of the second coating layer is preferably not less than 11.0 μm and not more than 23.9 μm, more preferably not less than 12.0 μm and not more than 23.8 μm, and further preferably not less than 12.8 μm and not more than 23.8 μm.

In addition, in the second coating layer used in the present embodiment, in order of positions at which the thickness is 20%, 40%, 60% and 80% of the second coating layer from the side of the first coating layer to the side opposite thereto, the Cu content increases, and the Ni content decreases. With this, in the second coating layer on the side of the first coating layer, since the Ni content increases, corrosion resistance is improved, and on the surface (the surface opposite to the first coating layer) of the second coating layer, adhesion to the friction part or adhesion to the third coating layer is improved. This is considered to be caused by the fact that, when the Cu content increases toward the surface (the surface opposite to the first coating layer) of the second coating layer, since the Ni content relatively decreases, it is possible to prevent the hardness of the second coating layer from being too great. In addition, in the second coating layer, when the Cu content increases and the Ni content decreases in order of positions at which the thickness is 20%, 40%, 60% and 80%, it is possible to prevent pinholes from being connected to the Fe part. As a result, the friction material of the present embodiment has improved corrosion resistance. In addition, in the friction material of the present embodiment, when a gradient of the Cu content and Ni content is imparted to the second coating layer in this manner, it is possible to prevent, for example, residual stress generated inside the plating from increasing, and a crack generation rate is reduced, and thus corrosion resistance is improved.

In addition, in the second coating layer used in the present embodiment, from the side of the first coating layer to the side opposite thereto, in three sections comprising a section from the position at which the thickness is 20% to the position at which the thickness is 40%, a section from the position at which the thickness is 40% to the position at which the thickness is 60%, and a section from the position at which the thickness is 60% to the position at which the thickness is 80%, an amount of Cu increased and an amount of Ni decreased are each preferably within 20 atom %. In the second coating layer, in these three sections, when the amount of Cu increased and the amount of Ni decreased are each within 20 atom %, the number of pores tends to be further reduced. From the same point of view, in the second coating layer, in these three sections, the amount of Cu increased and the amount of Ni decreased are each more preferably 1 to 18 atom %, further preferably 3 to 16 atom %, and particularly preferably 4 to 15 atom %.

Third Coating Layer

The coating layer used in the present embodiment preferably includes the third coating layer formed on a surface of the second coating layer which is opposite to the Fe part side. The third coating layer is preferably constituted of an alloy containing Cu, Ni and Sn, an alloy containing Cu, Ni and Zn, or an alloy containing Cu, Ni, Sn and Zn. The third coating layer constituted of an alloy containing Cu, Ni and Sn tends to further improve the adhesion to the friction part. The reason for this is unclear, but it is believed that the third coating layer containing Sn may make hardness thereof further lower. Zn instead of Sn in the third coating layer may also lead to the same effect. Therefore, the third coating layer may be a layer constituted of an alloy containing Cu, Ni and Zn, or an alloy containing Cu, Ni, Sn and Zn.

In the third coating layer, preferably, the Cu content is not less than 30 atom % and not more than 69.5 atom %, the Ni content is not less than 30 atom % and not more than 69.5 atom %, and the Sn and/or Zn content is not less than 0.5 atom % and not more than 6 atom %. The coating layer used in the present embodiment including the third coating layer having such Cu, Ni and Sn and/or Zn contents within the foregoing ranges may prevent pinholes from piercing through the Fe part, and as a result, tends to further improve the corrosion resistance of the friction material of the present embodiment. From the same point of view, in the third coating layer, more preferably, the Cu content is not less than 33 atom % and not more than 60 atom %, the Ni content is not less than 33 atom % and not more than 60 atom %, and the Sn and/or Zn content is not less than 1 atom % and not more than 6 atom %; and further preferably, the Cu content is not less than 36 atom % and not more than 56 atom %, the Ni content is not less than 38 atom % and not more than 58 atom %, and the Sn and/or Zn content is not less than 2 atom % and not more than 6 atom %.

The average thickness of the third coating layer is preferably not less than 0.1 µm and not more than 5.0 µm. The third coating layer having an average thickness of not less than 0.1 µm tends to allow pinholes to be prevented from piercing through the Fe part, and the third coating layer having an average thickness of not more than 5.0 µm tends to allow excessive Sn and/or Zn to be prevented from hardening the third coating layer, and tends to allow a decline in bonding strength of the third coating layer and the friction part to be suppressed. From the same point of view, the average thickness of the third coating layer is more preferably not less than 0.5 µm and not more than 3.0 µm, and further preferably not less than 1.2 µm and not more than 2.0 µm.

Here, in the present embodiment, thicknesses of layers constituting the coating layer can be measured using a scanning electron microscope (SEM) or a transmission electron microscope (TEM), and compositions of layers constituting the coating layer can be measured using an energy dispersive X-ray analyzing device (EDX). Specifically, first, any position on the produced friction material is cut using a cutting machine. Here, cutting is performed in order to obtain a cross section of the coating layer in the thickness direction. Next, the cut friction material is embedded in a resin. Then, the cross section of the coating layer in the thickness direction is subjected to mirror polishing, and the obtained mirror polished surface is used as a cross-sectional structure. A method of mirror polishing a cross section is not particularly limited, and examples thereof include a polishing method using a diamond paste and/or colloidal silica and ion milling. Finally, polishing can also be performed using an alumina paste as a finish. The thicknesses of layers constituting the coating layer can be measured by observing the obtained cross-sectional structure using a scanning electron microscope (SEM) or a transmission electron microscope (TEM). In addition, in order to determine the thicknesses of layers constituting the coating layer, line analysis is performed on the coating layer of the mirror polished surface in the thickness direction. The thicknesses of the first coating layer and the second coating layer are determined according to the Fe content. When the third coating layer is included, the thickness from the position at which Sn and/or Zn are detected to the surface (the side of the friction part) is determined as the thickness of the third coating layer. Line analysis is performed at three locations, and an average value of these thicknesses is determined as the thickness of each layer. Next, positions at which the thickness of the second coating layer is 20%, 40%, 60% and 80% are determined from the determined thickness of the second coating layer. The composition of the second coating layer at each position is a value obtained when line analysis is performed in a direction parallel to the surface of the Fe part. In this case, the length for line analysis is set to 10 µm. Here, the positions at which the thickness of the second coating layer is 20%, 40%, 60% and 80% are positions of 4 µm, 8 µm, 12 µm, and 16 µm in order from the side of the first coating layer toward the surface of the second coating layer when the thickness of the second coating layer is, for example, 20 μm.

Fe Part

The main component of the Fe part used in the present embodiment is Fe. In the Fe part, the Fe content is not less than 50 mass %, preferably not less than 70 mass %, more preferably not less than 80 mass %, further preferably not less than 90 mass %, and particularly preferably not less than 98 mass %. In the Fe part, the upper limit of the Fe content is, for example, not more than 99.9 mass %, but is not particularly restricted thereto. This may sufficiently diffuse Fe into the first coating layer when the coating layer is formed over the surface of the Fe part.

Examples of a component other than Fe which may be contained in the Fe part include, but are not particularly limited to, at least one selected from the group of C, Si, Mn, P, S, Ni, Cr and Mo, and at least one selected from the group consisting of C, Si, Mn, P and S is preferable.

Specific examples of the Fe part used in the present embodiment include, but are not particularly limited to, stainless steel, hot rolled steel sheets for automotive structural use, rolled steel for general structure, cold rolled steel sheets, carbon steel for machine structural use, and carbon tool steel. More specific examples thereof include, but are not particularly limited to, ferrite, SAPH440, SS400, S20C, S45C and SK85.

Friction Part

The friction part used in the present embodiment is formed on the surface of at least a part of the coating layer.

In the present embodiment, the friction part means a part having a higher coefficient of friction than the Fe part and the coating layer.

The friction part used in the present embodiment preferably comprises a matrix, a solid particle (hereinafter referred to as "a hard particle"), and a lubricant. Here, in the present embodiment, the material of the hard particles excludes those corresponding to the matrix and the material of the lubricant excludes those corresponding to the matrix and the hard particles.

The matrix is preferably at least one selected from the group of metal, alloy, any metal compound, and any intermetallic compound. The friction part used in the present embodiment preferably contains not less than 40 mass % and not more than 80 mass % of the matrix based on the total mass of the friction part. When the matrix content is not less than 40 mass % based on the total mass of the friction part, the hard particle and the lubricant may be prevented from falling off in braking by means of a part using the friction material, such as a brake, or during intermittent engine drive transmission by means of a part using the friction material, such as a clutch, which may prevent wear resistance thereof from lowering. This may also improve the adhesion to a part intended to be bonded to the friction part by sintering, that is, the Fe part. In contrast, when the matrix content is not more than 80 mass % based on the total mass of the friction part, the friction part may be prevented from being too fine, which may improve the coefficient of friction.

The matrix preferably contains at least one element selected from the group of Cu, Sn, Zn, Ni, Fe, Mn and P, and more preferably contains at least one element selected from the group of Cu, Sn, Zn, Ni and Fe. The matrix containing such an element tends to improve the friction property and the mechanical strength of the friction part. The Cu content is preferably not less than 0 mass % and not more than 90 mass %, more preferably not less than 15 mass % and not more than 80 mass %, and further preferably not less than 30 mass % and not more than 70 mass % based on a total amount of the matrix. In addition, the Sn content is preferably not less than 0 mass % and not more than not more than 15 mass %, more preferably not less than 0.5 mass % and not more than 13 mass %, and further preferably not less than 1 mass % and not more than 10 mass % based on a total amount of the matrix. In addition, the Zn content is preferably not less than 0 mass % and not more than 13 mass %, more preferably not less than 0.5 mass % and not more than 10 mass %, and further preferably not less than 1 mass % and not more than 9 mass % based on a total amount of the matrix. In addition, the Ni content is preferably not less than 0 mass % and not more than 98 mass %, more preferably not less than 10 mass % and not more than 80 mass %, and further preferably not less than 20 mass % and not more than 70 mass % based on a total amount of the matrix. In addition, the Fe content is preferably not less than 0 mass % and not more than 50 mass %, more preferably not less than 2 mass % and not more than 40 mass %, and further preferably not less than 5 mass % and not more than 35 mass % based on a total amount of the matrix. In addition, the Mn content is preferably not less than 0 mass % and not more than 12 mass %, more preferably not less than 0.5 mass % and not more than 8 mass %, and further preferably not less than 1 mass % and not more than 7 mass % based on a total amount of the matrix. In addition, the P content is preferably not less than 0 mass % and not more than 8 mass %, more preferably not less than 0.5 mass % and not more than 5 mass %, and further preferably not less than 1 mass % and not more than 3 mass % based on a total amount of the matrix. The matrix containing such an element in an amount within the foregoing ranges tends to further improve the friction property and the mechanical strength of the friction part.

The friction part used in the present embodiment preferably contains, as a hard particle, at least one selected from the group of carbide, nitride, oxide, and sulfide of at least one element selected from the group of Ti, Zr, Hf, V, Nb, Ta, Cr, Al, Mg and Si. The friction part used in the present embodiment containing such a hard particle has a high coefficient of friction, and is superior in wear resistance. The hard particle content is preferably not less than 5 mass % and not more than 30 mass % based on the total mass of the friction part. When the hard particle content is not less than 5 mass % based on the total mass of the friction part, the wear resistance of the friction part improves. In contrast, when the hard particle content is not more than 30 mass %, the matrix or the lubricant relatively increases, which improves the mechanical strength of the friction part, and makes it possible to suppress noise and shudders in braking or during intermittent transmission as described above. From the same point of view, the hard particle content is more preferably not less than 10 mass % and not more than 25 mass %, and further preferably not less than 10 mass % and not more than 20 mass %, based on the total mass of the friction part. The hard particle is preferably at least one selected from the group of carbide, nitride, oxide, and sulfide of at least one element selected from the group of Ti, Zr, Al, Mg, and Si, and more preferably at least one selected from the group of carbide and oxide of at least one element selected from the group of Ti, Zr, Al, Mg, and Si.

Specific examples of the hard particle include, but are not particularly limited to, aluminum oxide ($Al_2O_3$), zirconia ($ZrO_2$), silica ($SiO_2$), zircon sand ($ZrSiO_4$), rutile sand ($TiO_2$), magnesium oxide (MgO), and mullite ($3Al_2O_3 \cdot 2SiO_2$ to $2Ak_2O_3 \cdot SiO_2$). Among them, aluminum oxide, zircon sand, mullite, and silica are preferable because being further superior in wear resistance.

The friction part used in the present embodiment preferably contains, as lubricant, at least one selected from the group of graphite (C), molybdenum disulfide ($MoS_2$), tungsten disulfide ($WS_2$), boron nitride (BN), and calcium fluoride ($CaF_2$). This may suppress noise and shudders in braking or during intermittent transmission as described above. The lubricant content is preferably not less than 5 mass % and not more than 40 mass % based on the total mass of the friction part. When the lubricant content is not less than 5 mass % based on the total mass of the friction part, noise and shudders may be suppressed. When the lubricant content is not more than 40 mass %, the coefficient of friction may be improved. From the same point of view, the lubricant content is more preferably not less than 10 mass % and not more than 30 mass %, and further preferably not less than 15 mass % and not more than 25 mass %.

The friction part used in the present embodiment may contain a friction modifier. The friction modifier content is preferably not less than 1 mass % and not more than 20 mass % based on the total mass of the friction part. The friction modifier content is preferably not less than 1 mass % and not more than 20 mass % based on the total mass of the friction part because making it possible to more effectively and surely adjust the mechanical strength of the friction part and the coefficient of friction in braking or during intermittent transmission as described above. From the same point of view, the friction modifier content is more preferably not less than 3 mass % and not more than 15 mass %, and further preferably not less than 3 mass % and not more than 10 mass %.

Specific examples of the friction modifier include, but are not particularly limited to, at least one selected from the group of talc ($Mg_3Si_4O_{10}(OH)_2$), mica, calcium carbonate ($CaCO_3$) and coke (C). Such a friction modifier is preferably contained because making it possible to further effectively and surely adjust the mechanical strength of the friction part and the coefficient of friction in braking or during intermittent transmission as described above.

The composition ratio in the friction part, and the element ratio in the matrix may be obtained as follows. One may polish a surface of the friction part, to measure a texture of the polished surface by an energy dispersive X-ray spectrometry (EDX), a wavelength dispersive X-ray spectroscopy (WDS), etc. accompanying a scanning electron microscope (SEM): SEM may magnify the texture of the friction part 50 to 2000 times, to obtain the composition ratio of the friction part by EDX; and SEM may magnify the texture of the friction part 3000 to 10000 times so that the texture does not contain the hard particle or the lubricant, to obtain the element ratio in the matrix by EDX.

Method of Producing Friction Material

A method of producing the friction material of the present embodiment will be described with reference to specific examples. The method of producing the friction material of the present embodiment is not particularly limited as long as the configurations of the friction material may be achieved thereby.

For example, the method of producing the friction material of the present embodiment comprises:

Step (A): a step of mixing a raw material powder comprising a metal powder to constitute the matrix, a hard particle powder, a lubricant powder, and a friction modifier powder to obtain a mixture, and molding the mixture into a predetermined shape to make the friction part;

Step (B): a step of forming a plated layer over the surface of the prepared Fe part by electroplating;

Step (C): a step of putting the made friction part on a surface of at least a part of the plated layer formed over the Fe part, putting this Fe part inside a furnace, and heating the Fe part; and Step (D): a step of, after heating the Fe part, cooling the inside of the furnace to room temperature, taking out the friction material from the furnace, and polishing a surface of the friction material until the friction material has predetermined dimensions.

Each step of the method of producing the friction material of the present embodiment has the following meaning.

In Step (A), the matrix, the hard particle, the lubricant, the friction modifier, etc. are suitably incorporated and mixed as a raw material powder of the friction part, which makes it possible to make a uniformly mixed friction part having a predetermined formulation. Instead of the metal powder, an alloy powder, a metal compound powder, or an intermetallic compound powder may be used.

In Step (B), the structure of the plated layer is made to be, for example, 1: Cu (1.5 to 5.0 μm in thickness), 2: Ni (9.0 to 20.2 μm in thickness), 3: Cu (2.0 to 9.0 μm in thickness), and 4/5: Sn and/or Zn (0.1 to 2.0 μm in thickness) in order from the Fe part side. Then, the structure is heated under the conditions described later, to thereby obtain a coating layer having predetermined configurations.

In Step (C), the made friction part is put on the surface of at least a part of the plated layer formed over the Fe part, then the friction part is put inside a furnace, and is heated under conditions of a temperature within a range of 800 to 950° C. for 0.5 to 3 hours in a reducing atmosphere (such as $H_2$, CO, $H_2S$ and $CH_4$) or an inert gas (such as $N_2$, $N_2+H_2$ and Ar gas) atmosphere, which makes it possible to obtain a coating layer having predetermined configurations, and which also makes the friction part dense and the mechanical strength thereof improved, and improves the adhesion of the friction part and the Fe part. When a pressure of 0.1 to 5 MPa is applied to the friction part in heating in an Ar gas atmosphere, the wear resistance of the friction part tends to improve.

Also in Step (C), the Fe content of not less than 50 mass % in the Fe part may diffuse Fe into the plated layer. At this time, although the heating temperature is about 800° C., Fe can be diffused into the plated layer, the heating temperature of not less than 850° C. may easily diffuse Fe into the plated layer. Since depending on the Fe content, the thickness of the first coating layer may be adjusted by controlling the heating temperature and the heating time. The thickness of the second coating layer may be adjusted by controlling the thickness of the plated layer. In addition, in the second coating layer, in order of positions at which the thickness is 20%, 40%, 60% and 80% of the second coating layer from the side of the first coating layer to the side opposite thereto, in order to increase the Cu content, for example, a method of forming a Cu plated layer on the side of the friction part, may be used. Specifically, for example, regarding the order of forming the plated layer, in order from the side of the first coating layer, the first layer can be formed of Cu, the second layer can be formed of Ni, and the third layer can be formed of Cu. In addition, when the heating time is shortened to 0.5 to 1.5 hours, in the second coating layer, from the side of the first coating layer toward the surface of the second coating layer, an amount of Cu increased and an amount of Ni decreased can be reduced. In addition, when the third coating layer is formed, for example, after the above third Cu plated layer is formed, a Sn and/or Zn plated layer is additionally formed.

In Step (D), after the heating, the inside of the furnace is cooled to room temperature, the friction material is taken out from the furnace, and the surface of the friction material is polished, which may adjust the dimensions of the friction material. In addition, when a cooling rate in the step (D) is adjusted to a gentle range, for example, a range of 1° C./min to 5° C./min, in the second coating layer, from the side of the first coating layer toward the surface of the second coating layer, an amount of Cu increased and an amount of Ni decreased can be reduced. In addition, when the cooling rate in the step (D) is lower, Fe can be diffused into the plated layer.

Since superior in corrosion resistance, and superior in the adhesion of the back plate and the friction part, the friction material of the present embodiment may be used for equipment for controlling, as desired, rotation or movement of various types of machines such as machine tools, construction machinery, agricultural machinery, automobiles, two-wheeled vehicles, trains, aircrafts, and ships; such equipment is so-called clutches or brakes.

EXAMPLES

Hereinafter the present invention will be described in more detail with reference to Examples. The present invention is not limited to these Making Friction Part A raw material powder having the composition shown in the following Table 1 was mixed to obtain a mixture, and the mixture was molded to make a friction part (brake lining).

TABLE 1

|  | Matrix | | | | | Lubricant | | Hard particle | | Friction modifier |
|---|---|---|---|---|---|---|---|---|---|---|
|  | Cu | Sn | Zn | Ni | Fe | Graphite | $CaF_2$ | $ZrSiO_4$ | Mullite | Cokes |
| Friction part (mass %) | 36 | 5 | 2 | 20 | 5 | 12 | 3 | 7 | 5 | 5 |

Preparation of Fe Part

Fe parts 1 and 2 (back plates) having the composition shown in the following Table 2 were prepared.

TABLE 2

|  | C | Si | Mn | P | S | Fe |
|---|---|---|---|---|---|---|
| Fe part 1 (mass %) | 0.20 | 0.24 | 0.45 | 0.06 | 0.01 | 99.04 |
| Fe part 2 (mass %) | 0.45 | 0.22 | 0.76 | 0.05 | 0.01 | 98.51 |

Example 1

First to fifth layers each having the composition, structure, and thickness shown in the following Table 3 were electroplated in order over a surface of the prepared Fe part 1 under generally employed conditions, to obtain a plated layer.

TABLE 3

|  | Plated layer | | | | | | | | | | Total |
|---|---|---|---|---|---|---|---|---|---|---|---|
|  | First layer | | Second layer | | Third layer | | Fourth layer | | Fifth layer | | |
|  | Composition | Thickness (μm) | Composition | Thickness (μm) | Composition | Thickness (μm) | Composition | Thickness (μm) | Composition | Thickness (μm) | Thickness (μm) |
| Invention sample 1 | Cu | 4.0 | Ni | 15.0 | Cu | 3.0 | — | | — | | 22.0 |
| Invention sample 2 | Cu | 4.0 | Ni | 15.0 | Cu | 3.0 | — | | — | | 22.0 |
| Invention sample 3 | Cu | 2.0 | Ni | 18.0 | Cu | 2.0 | — | | — | | 22.0 |
| Invention sample 4 | Cu | 4.0 | Ni | 20.2 | Cu | 4.0 | — | | — | | 28.2 |
| Invention sample 5 | Cu | 2.0 | Ni | 11.0 | Cu | 3.0 | — | | — | | 16.0 |
| Invention sample 6 | Cu | 4.0 | Ni | 9.0 | Cu | 2.4 | — | | — | | 15.4 |
| Invention sample 7 | Cu | 4.0 | Ni | 20.0 | Cu | 4.7 | — | | — | | 28.7 |
| Invention sample 8 | Cu | 4.0 | Ni | 15.0 | Cu | 3.0 | Sn | 1.1 | — | | 23.1 |
| Invention sample 9 | Cu | 4.0 | Ni | 15.0 | Cu | 3.0 | Zn | 1.1 | — | | 23.1 |
| Invention sample 10 | Cu | 4.0 | Ni | 15.0 | Cu | 3.0 | Sn | 0.6 | Zn | 0.5 | 23.1 |

TABLE 3-continued

| | Plated layer | | | | | | | | | |
|---|---|---|---|---|---|---|---|---|---|---|
| | First layer | | Second layer | | Third layer | | Fourth layer | | Fifth layer | Total |
| | Composition | Thickness (μm) | Composition | Thickness (μm) | Composition | Thickness (μm) | Composition | Thickness (μm) | Composition | Thickness (μm) | Thickness (μm) |
| Invention sample 11 | Cu | 2.6 | Ni | 18.0 | Cu | 4.0 | Sn | 1.0 | Zn | 1.0 | 26.6 |
| Invention sample 12 | Cu | 4.0 | Ni | 12.9 | Cu | 3.0 | Sn | 1.0 | Zn | 1.0 | 21.9 |
| Comparative sample 1 | Cu | 22.0 | — | | — | | — | | — | | 22.0 |
| Comparative sample 2 | Ni | 22.0 | — | | — | | — | | — | | 22.0 |
| Comparative sample 3 | Cu | 2.0 | Ni | 17.0 | Cu | 3.0 | — | | — | | 22.0 |
| Comparative sample 4 | Cu | 6.0 | Ni | 10.0 | Cu | 6.0 | — | | — | | 22.0 |
| Comparative sample 5 | Cu | 4.0 | Ni | 6.4 | Cu | 3.0 | — | | — | | 13.4 |
| Comparative sample 6 | Cu | 5.0 | Ni | 22.5 | Cu | 7.0 | — | | — | | 34.5 |
| Comparative sample 7 | Cu | 4.0 | Ni | 13.9 | Cu | 2.4 | Sn | 1.1 | — | | 21.4 |
| Comparative sample 8 | Cu | 6.0 | Ni | 13.0 | Cu | 6.0 | — | | — | | 25.0 |
| Comparative sample 9 | Cu | 6.0 | Ni | 16.0 | — | | — | | — | | 22.0 |
| Comparative sample 10 | Cu | 4.0 | Ni | 7.5 | Cu | 7.0 | Ni | 6.0 | Zn | 2.1 | 26.6 |

* In the table, "—" indicates that no layer was formed.

The prepared friction part was put on a surface of the plated layer formed over the Fe part 1 to be put inside a furnace, and was heated under the conditions shown in the following Table 4 to adhere the Fe part 1 and the friction part via the plated layer, to make a friction material. After the heating, the inside of the furnace was cooled to room temperature at a cooling rate shown in the following Table 4, and the friction material was taken out from the furnace. The taken friction material was polished to adjust the dimensions thereof, to obtain a sample (Invention samples 1 to 12 and Comparative samples 1 to 10) that was a friction material in the form of a brake.

TABLE 4

| | Heating treatment | | | Cooling rate (° C./min) |
|---|---|---|---|---|
| | Temperature (° C.) | Atmosphere | Time (hours) | |
| Invention sample 1 | 900 | Ar | 1 | 3 |
| Invention sample 2 | 850 | H₂ | 1.5 | 2 |
| Invention sample 3 | 830 | Ar | 0.5 | 1 |
| Invention sample 4 | 900 | Ar | 1 | 3 |
| Invention sample 5 | 830 | Ar | 1 | 1 |
| Invention sample 6 | 900 | Ar | 0.5 | 2 |
| Invention sample 7 | 900 | Ar | 1 | 1 |
| Invention sample 8 | 850 | Ar | 1 | 1 |
| Invention sample 9 | 900 | Ar | 1 | 3 |
| Invention sample 10 | 880 | Ar | 1 | 2 |
| Invention sample 11 | 830 | Ar | 1 | 3 |
| Invention sample 12 | 900 | Ar | 1.5 | 5 |
| Comparative sample 1 | 900 | Ar | 1 | 5 |
| Comparative sample 2 | 900 | Ar | 1 | 5 |
| Comparative sample 3 | 800 | Ar | 0.5 | 1 |
| Comparative sample 4 | 900 | Ar | 3 | 3 |
| Comparative sample 5 | 850 | Ar | 1 | 1 |
| Comparative sample 6 | 900 | Ar | 1.5 | 5 |
| Comparative sample 7 | 700 | Ar | 1 | 5 |
| Comparative sample 8 | 950 | Ar | 4 | 3 |
| Comparative sample 9 | 900 | Ar | 1.5 | 6 |
| Comparative sample 10 | 900 | Ar | 1.5 | 6 |

For the obtained sample (Invention samples 1 to 12 and Comparative samples 1 to 10), the structure of a coating layer formed between the Fe part 1 and the friction part was measured as follows. The thickness of each layer constituting the coating layer was measured by means of a scanning electron microscope (SEM). In addition, compositions of layers constituting the coating layer were measured using an energy dispersive X-ray analyzing device (EDX). Specifically, first, any position on the produced samples was cut using a cutting machine. In this case, cutting was performed so that a cross section of the coating layer in the thickness direction was obtained. Next, the cut samples were embedded in a resin. Then, the cross section of the coating layer in the thickness direction was subjected to mirror polishing using a diamond paste, finish polishing was then performed using an alumina paste, and the obtained mirror polished surface was used as a cross-sectional structure. The thicknesses of layers constituting the coating layer were measured by observing the obtained cross-sectional structure using a scanning electron microscope (SEM). In addition, in order to determine the thicknesses of layers constituting the coating layer, line analysis was performed on the coating layer of the mirror polished surface in the thickness direction. The thicknesses of the first coating layer and the second coating layer were determined according to the Fe content. When the third coating layer was included, the thickness from the position at which Sn and/or Zn were detected to the surface (the side of the friction part) was determined as the thickness of the third coating layer. Line analysis was performed at three locations, and an average value of these thicknesses was determined as the thickness of each layer. Next, positions at which the thickness of the second coating layer was 20%, 40%, 60% and 80% were determined from the determined thickness of the second coating layer. Here, the composition of the second coating layer at each position was a value obtained when line analysis was performed in a direction parallel to the surface of the Fe part. These measurement results are shown in the following Table 5. In addition, changes in the Cu content and Ni content in the second coating layer of the samples are shown in the following Tables 6 and 7.

TABLE 5

| | Coating layer | | | | | | | | | | | | | | |
|---|---|---|---|---|---|---|---|---|---|---|---|---|---|---|---|
| | First coating layer | | | | Second coating layer | | | | | | | | | | |
| | | | | | Position at which the thickness is 20% | | | | Position at which the thickness is 40% | | | | Position at which the thickness is 60% | | |
| | Composition (atom %) | | | Thickness | Composition (atom %) | | | measurement position | Composition (atom %) | | | measurement position | Composition (atom %) | | |
| | Cu | Ni | Fe | (μm) | Cu | Ni | Fe | (μm) | Cu | Ni | Fe | (μm) | Cu | Ni | Fe |
| Invention sample 1 | 26 | 8 | 66 | 4.5 | 12 | 84 | 4 | 3.5 | 23 | 74 | 3 | 7.0 | 36 | 62 | 2 |
| Invention sample 2 | 22 | 7 | 71 | 5.8 | 10 | 82 | 8 | 3.2 | 18 | 76 | 6 | 6.5 | 30 | 66 | 4 |
| Invention sample 3 | 42 | 40 | 18 | 1.8 | 8 | 90 | 2 | 4.0 | 16 | 84 | 0 | 8.1 | 24 | 76 | 0 |
| Invention sample 4 | 30 | 8 | 62 | 4.4 | 8 | 88 | 4 | 4.8 | 22 | 76 | 2 | 9.5 | 30 | 70 | 0 |
| Invention sample 5 | 34 | 12 | 54 | 3.2 | 26 | 70 | 4 | 2.6 | 30 | 66 | 4 | 5.1 | 38 | 62 | 0 |
| Invention sample 6 | 17 | 13 | 70 | 2.4 | 7 | 86 | 7 | 2.6 | 20 | 75 | 5 | 5.2 | 34 | 64 | 2 |
| Invention sample 7 | 24 | 9 | 67 | 5.5 | 12 | 81 | 7 | 4.6 | 20 | 75 | 5 | 9.3 | 28 | 70 | 2 |
| Invention sample 8 | 24 | 7 | 69 | 4.2 | 13 | 84 | 3 | 3.5 | 22 | 76 | 2 | 7.0 | 34 | 66 | 0 |
| Invention sample 9 | 26 | 8 | 66 | 4.4 | 12 | 85 | 3 | 3.5 | 24 | 75 | 1 | 6.9 | 37 | 63 | 0 |
| Invention sample 10 | 25 | 8 | 67 | 4.4 | 11 | 84 | 5 | 3.5 | 21 | 74 | 5 | 7.0 | 33 | 65 | 2 |
| Invention sample 11 | 30 | 10 | 60 | 2.6 | 11 | 82 | 7 | 4.4 | 23 | 76 | 1 | 8.8 | 35 | 65 | 0 |
| Invention sample 12 | 25 | 7 | 68 | 4.4 | 11 | 82 | 7 | 4.4 | 22 | 76 | 2 | 8.8 | 48 | 52 | 0 |
| Comparative sample 1 | 32 | 0 | 68 | 2.6 | 95 | 0 | 5 | 3.9 | 96 | 0 | 4 | 7.8 | 97 | 0 | 3 |
| Comparative sample 2 | 0 | 27 | 73 | 3.2 | 0 | 94 | 6 | 3.8 | 0 | 95 | 5 | 7.5 | 0 | 97 | 3 |
| Comparative sample 3 | 44 | 4 | 52 | 0.5 | 25 | 73 | 2 | 4.3 | 32 | 66 | 2 | 8.6 | 38 | 62 | 0 |
| Comparative sample 4 | 30 | 10 | 60 | 8.0 | 7 | 89 | 4 | 2.6 | 21 | 76 | 3 | 5.2 | 36 | 64 | 0 |
| Comparative sample 5 | 30 | 8 | 62 | 4.4 | 26 | 70 | 4 | 1.8 | 30 | 66 | 4 | 3.6 | 38 | 62 | 0 |
| Comparative sample 6 | 31 | 8 | 61 | 4.5 | 10 | 83 | 7 | 6.0 | 16 | 80 | 4 | 12.0 | 25 | 75 | 0 |
| Comparative sample 7 | None | | | 0.0 | 55 | 45 | 0 | 4.0 | 38 | 62 | 0 | 8.0 | 19 | 81 | 0 |
| Comparative sample 8 | 32 | 24 | 44 | 20.0 | 42 | 50 | 8 | 0.4 | 42 | 50 | 8 | 0.8 | 40 | 52 | 8 |
| Comparative sample 9 | 28 | 9 | 63 | 4.4 | 85 | 10 | 5 | 3.5 | 61 | 38 | 1 | 7.0 | 44 | 56 | 0 |
| Comparative sample 10 | 26 | 8 | 66 | 4.6 | 34 | 64 | 2 | 4.0 | 68 | 32 | 0 | 8.0 | 48 | 52 | 0 |

TABLE 5-continued

| | | Coating layer | | | | | | | | | |
|---|---|---|---|---|---|---|---|---|---|---|---|
| | | Second coating layer | | | | | | | | | |
| | | Position at which the thickness is 60% | Position at which the thickness is 80% | | | | | | | | |
| | | Composition measurement position | Composition (atom %) | | | Composition measurement position | Thick-ness | Third coating layer | | | Total thickness |
| | | | | | | | | Composition (atom %) | | | Thick-ness | |
| | | (μm) | Cu | Ni | Fe | (μm) | (μm) | Cu | Ni | Fe | Sn | Zn | (μm) | (μm) |

| | Position 60% (μm) | Cu | Ni | Fe | Position 80% (μm) | Thickness (μm) | Cu | Ni | Fe | Sn | Zn | Thickness (μm) | Total thickness (μm) |
|---|---|---|---|---|---|---|---|---|---|---|---|---|---|
| Invention sample 1 | 10.5 | 50 | 50 | 0 | 14.0 | 17.5 | None | | | | | | 22.0 |
| Invention sample 2 | 9.7 | 44 | 55 | 1 | 13.0 | 16.2 | None | | | | | | 22.0 |
| Invention sample 3 | 12.1 | 30 | 70 | 0 | 16.2 | 20.2 | None | | | | | | 22.0 |
| Invention sample 4 | 14.3 | 45 | 55 | 0 | 19.0 | 23.8 | None | | | | | | 28.2 |
| Invention sample 5 | 7.7 | 42 | 58 | 0 | 10.2 | 12.8 | None | | | | | | 16.0 |
| Invention sample 6 | 7.8 | 44 | 54 | 2 | 10.4 | 13.0 | None | | | | | | 15.4 |
| Invention sample 7 | 13.9 | 39 | 60 | 1 | 18.6 | 23.2 | None | | | | | | 28.7 |
| Invention sample 8 | 10.5 | 45 | 55 | 0 | 14.0 | 17.5 | 36 | 58 | 0 | 6 | 0 | 1.4 | 23.1 |
| Invention sample 9 | 10.4 | 47 | 53 | 0 | 13.8 | 17.3 | 38 | 58 | 0 | 0 | 4 | 1.4 | 23.1 |
| Invention sample 10 | 10.5 | 42 | 57 | 1 | 14.0 | 17.5 | 48 | 48 | 0 | 2 | 2 | 1.2 | 23.1 |
| Invention sample 11 | 13.2 | 48 | 52 | 0 | 17.6 | 22.0 | 56 | 38 | 0 | 6 | 0 | 2.0 | 26.6 |
| Invention sample 12 | 13.2 | 56 | 44 | 0 | 17.6 | 17.5 | 50 | 46 | 0 | 2 | 2 | 2.0 | 23.9 |
| Comparative sample 1 | 11.6 | 99 | 0 | 1 | 15.5 | 19.4 | None | | | | | | 22.0 |
| Comparative sample 2 | 11.3 | 0 | 99 | 1 | 15.0 | 18.8 | None | | | | | | 22.0 |
| Comparative sample 3 | 12.9 | 44 | 56 | 0 | 17.2 | 21.5 | None | | | | | | 22.0 |
| Comparative sample 4 | 7.8 | 47 | 53 | 0 | 11.2 | 14.0 | None | | | | | | 22.0 |
| Comparative sample 5 | 5.4 | 42 | 58 | 0 | 7.2 | 9.0 | None | | | | | | 13.4 |
| Comparative sample 6 | 18.0 | 44 | 56 | 0 | 24.0 | 30.0 | None | | | | | | 34.5 |
| Comparative sample 7 | 12.0 | 15 | 85 | 0 | 16.0 | 20.0 | 36 | 58 | 0 | 6 | 0 | 1.4 | 21.4 |
| Comparative sample 8 | 1.2 | 40 | 52 | 8 | 1.6 | 2.0 | None | | | | | | 22.0 |
| Comparative sample 9 | 10.6 | 26 | 74 | 0 | 14.1 | 17.6 | None | | | | | | 22.0 |
| Comparative sample 10 | 12.0 | 40 | 60 | 0 | 16.0 | 20.0 | 38 | 58 | 0 | 0 | 4 | 2.0 | 26.6 |

* In Comparative sample 7, since diffusion of the Fe component was not confirmed, for convenience, first coating layer was set as "None".

TABLE 6

| | Second coating layer | |
|---|---|---|
| | Change in content of Cu | Change in content of Ni |
| Invention sample 1 | Increase in order of the thickness of 20%, 40%, 60%, and 80% | Decrease in order of the thickness of 20%, 40%, 60%, and 80% |
| Invention sample 2 | Increase in order of the thickness of 20%, 40%, 60%, and 80% | Decrease in order of the thickness of 20%, 40%, 60%, and 80% |
| Invention sample 3 | Increase in order of the thickness of 20%, 40%, 60%, and 80% | Decrease in order of the thickness of 20%, 40%, 60%, and 80% |
| Invention sample 4 | Increase in order of the thickness of 20%, 40%, 60%, and 80% | Decrease in order of the thickness of 20%, 40%, 60%, and 80% |

TABLE 6-continued

| | Second coating layer | |
|---|---|---|
| | Change in content of Cu | Change in content of Ni |
| Invention sample 5 | Increase in order of the thickness of 20%, 40%, 60%, and 80% | Decrease in order of the thickness of 20%, 40%, 60%, and 80% |
| Invention sample 6 | Increase in order of the thickness of 20%, 40%, 60%, and 80% | Decrease in order of the thickness of 20%, 40%, 60%, and 80% |
| Invention sample 7 | Increase in order of the thickness of 20%, 40%, 60%, and 80% | Decrease in order of the thickness of 20%, 40%, 60%, and 80% |
| Invention sample 8 | Increase in order of the thickness of 20%, 40%, 60%, and 80% | Decrease in order of the thickness of 20%, 40%, 60%, and 80% |
| Invention sample 9 | Increase in order of the thickness of 20%, 40%, 60%, and 80% | Decrease in order of the thickness of 20%, 40%, 60%, and 80% |
| Invention sample 10 | Increase in order of the thickness of 20%, 40%, 60%, and 80% | Decrease in order of the thickness of 20%, 40%, 60%, and 80% |
| Invention sample 11 | Increase in order of the thickness of 20%, 40%, 60%, and 80% | Decrease in order of the thickness of 20%, 40%, 60%, and 80% |
| Invention sample 12 | Increase in order of the thickness of 20%, 40%, 60%, and 80% | Decrease in order of the thickness of 20%, 40%, 60%, and 80% |
| Comparative sample 1 | Increase in order of the thickness of 20%, 40%, 60%, and 80% | Not included |
| Comparative sample 2 | Not included | Increase in order of the thickness of 20%, 40%, 60%, and 80% |
| Comparative sample 3 | Increase in order of the thickness of 20%, 40%, 60%, and 80% | Decrease in order of the thickness of 20%, 40%, 60%, and 80% |
| Comparative sample 4 | Increase in order of the thickness of 20%, 40%, 60%, and 80% | Decrease in order of the thickness of 20%, 40%, 60%, and 80% |
| Comparative sample 5 | Increase in order of the thickness of 20%, 40%, 60%, and 80% | Decrease in order of the thickness of 20%, 40%, 60%, and 80% |
| Comparative sample 6 | Increase in order of the thickness of 20%, 40%, 60%, and 80% | Decrease in order of the thickness of 20%, 40%, 60%, and 80% |
| Comparative sample 7 | Decrease in order of the thickness of 20%, 40%, 60%, and 80% | Increase in order of the thickness of 20%, 40%, 60%, and 80% |
| Comparative sample 8 | Decrease in order of the thickness of 40% and 60% | Increase in order of the thickness of 40% and 60% |
| Comparative sample 9 | Decrease in order of the thickness of 20%, 40%, 60%, and 80% | Increase in order of the thickness of 20%, 40%, 60%, and 80% |
| Comparative sample 10 | Increase and decrease | Decrease and increase |

TABLE 7

| | Second coating layer | | | | | |
|---|---|---|---|---|---|---|
| | Amount of change in Cu content (atomic weight %) | | | Amount of change in Ni content (atomic weight %) | | |
| | Difference between a position in which the thickness is 20% and the position at which the thickness is 40% | Difference between a position in which the thickness is 40% and the position at which the thickness is 60% | Difference between a position in which the thickness is 60% and the position at which the thickness is 80% | Difference between a position in which the thickness is 20% and the position at which the thickness is 40% | Difference between a position in which the thickness is 40% and the position at which the thickness is 60% | Difference between a position in which the thickness is 60% and the position at which the thickness is 80% |
| Invention sample 1 | 11 | 13 | 14 | 10 | 12 | 12 |
| Invention sample 2 | 8 | 12 | 14 | 6 | 10 | 11 |
| Invention sample 3 | 8 | 8 | 6 | 6 | 8 | 6 |
| Invention sample 4 | 14 | 8 | 15 | 12 | 6 | 15 |
| Invention sample 5 | 4 | 8 | 4 | 4 | 4 | 4 |
| Invention sample 6 | 13 | 14 | 10 | 11 | 11 | 10 |
| Invention sample 7 | 8 | 8 | 11 | 6 | 5 | 10 |
| Invention sample 8 | 9 | 12 | 11 | 8 | 10 | 11 |
| Invention sample 9 | 12 | 13 | 10 | 10 | 12 | 10 |
| Invention sample 10 | 10 | 12 | 9 | 10 | 9 | 8 |
| Invention sample 11 | 12 | 12 | 13 | 6 | 11 | 13 |

TABLE 7-continued

| | Second coating layer | | | | | |
|---|---|---|---|---|---|---|
| | Amount of change in Cu content (atomic weight %) | | | Amount of change in Ni content (atomic weight %) | | |
| | Difference between a position in which the thickness is 20% and the position at which the thickness is 40% | Difference between a position in which the thickness is 40% and the position at which the thickness is 60% | Difference between a position in which the thickness is 60% and the position at which the thickness is 80% | Difference between a position in which the thickness is 20% and the position at which the thickness is 40% | Difference between a position in which the thickness is 40% and the position at which the thickness is 60% | Difference between a position in which the thickness is 60% and the position at which the thickness is 80% |
| Invention sample 12 | 11 | 26 | 8 | 6 | 24 | 8 |
| Comparative sample 1 | 1 | 1 | 2 | 0 | 0 | 0 |
| Comparative sample 2 | 0 | 0 | 0 | 1 | 2 | 2 |
| Comparative sample 3 | 7 | 6 | 6 | 7 | 4 | 6 |
| Comparative sample 4 | 14 | 15 | 11 | 13 | 12 | 11 |
| Comparative sample 5 | 4 | 8 | 4 | 4 | 4 | 4 |
| Comparative sample 6 | 6 | 9 | 19 | 3 | 5 | 19 |
| Comparative sample 7 | 17 | 19 | 4 | 17 | 19 | 4 |
| Comparative sample 8 | 0 | 2 | 0 | 0 | 2 | 0 |
| Comparative sample 9 | 24 | 17 | 18 | 28 | 18 | 18 |
| Comparative sample 10 | 34 | 20 | 8 | 32 | 20 | 8 |

* The amount of change (difference) in the Cu content and Ni content at each position was an absolute value.

The following salt spray test, corrosion resistance test, and shear test and measurement of the number of cracks were conducted on the obtained sample. The results thereof are shown in Table 10.

Salt Spray Test

The salt spray test was conducted in a manner conforming to "Methods of Corrosion Resistance Test For Metallic Coatings" in Japanese Industrial Standards (JIS H 8502) except that the concentration of salt water was adjusted to 5 mass % and the conditions shown in the following Table 8 were set.

TABLE 8

| Temperature | 35° C. |
|---|---|
| Humidity | 95% |
| Time | 32 hours |

The salt spray test was conducted on three samples, and it was observed whether the samples rusted or not (the external appearance was observed) after the test, to calculate the proportion of rust generation.

Corrosion Resistance Test

The corrosion resistance test was conducted in a manner conforming to "Test Procedure of Rusting at Material Interfaces for Disc Brake Pads of Automobiles" in Japanese Industrial Standards (JIS D 4419) except that the concentration of salt water was adjusted to 5 mass % and the conditions shown in the following Table 9 were set.

TABLE 9

| (i) Testing machine | Temperature | 50° C. |
|---|---|---|
| | Humidity | 95% |
| | Time | 72 hours |

TABLE 9-continued

| (ii) Air | Temperature | 23° C. |
|---|---|---|
| | Humidity | 50% |
| | Time | 24 hours |

The corrosion resistance test was conducted on nine of the samples. Three series of the corrosion resistance tests of 3 cycles, 8 cycles and 16 cycles were conducted on every three samples, where 1 cycle is constituted of the corrosion resistance test in (i) Testing machine in Table 9 and the corrosion resistance test in (ii) Air in Table 7. After each series was completed, the friction part and the Fe part of the sample were separated, deterioration of the plating on the Fe part side, and whether the Fe part rusted or not were observed, and the proportion of rust generation on the sample was calculated.

Shear Test

Shear strength was measured in a manner conforming to "Automotive Parts Drum Brake Shoe Assemblies and Disc Brake Pad Shear Test Procedure" in Japanese Industrial Standards (JIS D 4422). The shear test was conducted at 300° C. Shear strengths when the sample broke (MPa) are shown in Table 10. It is evaluated that as shear strength when the sample broke was higher, the adhesion was higher.

Measurement of Number of Cracks with a Size of 10 µm or More

The polished surface prepared by the above composition analysis in the samples was observed under an optical microscope, and the number of cracks with a size of not less than 10 µm was measured. The measurement range was any range of 500 µm in a direction parallel to the surface of the Fe part. In addition, evaluation criteria were as follows.

A: No cracks with a size of not less than 10 μm were observed.
B: One or two cracks with a size of not less than 10 μm were observed.
C: Three or more cracks with a size of not less than 10 μm were observed.

TABLE 10

|  | The number of cracks with a size of not less than 10 μm | Salt spray test Proportion of rust generation (%) | Corrosion resistance test Proportion of rust generation (%) | | | Shear test Shear strength (MPa) |
| --- | --- | --- | --- | --- | --- | --- |
|  |  |  | 3 cycles | 8 cycles | 16 cycles |  |
| Invention sample 1 | A | 0 | 0 | 0 | 0 | 18 |
| Invention sample 2 | A | 0 | 0 | 0 | 33 | 17 |
| Invention sample 3 | A | 0 | 0 | 0 | 0 | 19 |
| Invention sample 4 | A | 0 | 0 | 0 | 0 | 16 |
| Invention sample 5 | A | 0 | 0 | 0 | 33 | 18 |
| Invention sample 6 | A | 33 | 0 | 0 | 33 | 20 |
| Invention sample 7 | A | 0 | 0 | 0 | 0 | 17 |
| Invention sample 8 | A | 0 | 0 | 0 | 0 | 19 |
| Invention sample 9 | A | 0 | 0 | 0 | 0 | 19 |
| Invention sample 10 | A | 0 | 0 | 0 | 0 | 19 |
| Invention sample 11 | A | 0 | 0 | 0 | 0 | 16 |
| Invention sample 12 | B | 33 | 0 | 0 | 33 | 17 |
| Comparative sample 1 | A | 100 | 100 | 100 | 100 | 17 |
| Comparative sample 2 | A | 100 | 100 | 100 | 100 | 5 |
| Comparative sample 3 | A | 100 | 67 | 100 | 100 | 8 |
| Comparative sample 4 | A | 67 | 33 | 100 | 100 | 17 |
| Comparative sample 5 | A | 33 | 0 | 33 | 100 | 19 |
| Comparative sample 6 | B | 0 | 0 | 0 | 100 | 14 |
| Comparative sample 7 | B | 100 | 67 | 100 | 100 | 5 |
| Comparative sample 8 | A | 100 | 100 | 100 | 100 | 18 |
| Comparative sample 9 | C | 67 | 0 | 33 | 100 | 12 |
| Comparative sample 10 | C | 33 | 0 | 0 | 100 | 14 |

It is found from Table 10 that every Invention sample had a proportion of rust generation in the salt spray test of not more than 33%, a proportion of rust generation in the corrosion resistance tests of 16 cycles of not more than 33%, shear strength in the shear test of not less than 10 MPa and the number of cracks with a size of not less than 10 μm of not more than 2, and thus generally had corrosion resistance and adhesion superior to Comparative samples.

INDUSTRIAL APPLICABILITY

Since superior in corrosion resistance, and superior in the adhesion of the back plate and the friction part, the friction material of the present embodiment may be used for equipment for controlling, as desired, rotation or movement of various types of machines such as machine tools, construction machinery, agricultural machinery, automobiles, two-wheeled vehicles, trains, aircrafts, and ships; such equipment is so-called clutches or brakes.

REFERENCE SIGNS LIST

1: Friction part, 2: Fe part, 3: Coating layer, 4: First coating layer, 5: Second coating layer, 6: Third coating layer, 7: Friction material

What is claimed is:
1. A friction material comprising: a Fe part which contains Fe as a main component; a coating layer formed over a surface of the Fe part; and a friction part formed on a surface of at least a part of the coating layer, wherein:
the friction part has a higher coefficient of friction than the Fe part and the coating layer,
the coating layer comprises a first coating layer and a second coating layer in order from Fe part side,
the first coating layer is constituted of an alloy containing Cu, Ni and Fe such that Fe content be not less than 10 atom %,
the second coating layer is constituted of an alloy containing Cu and Ni, or an alloy containing Cu, Ni and Fe such that Fe content be less than 10 atom %,
in the second coating layer, in order of positions at which the thickness is 20%, 40%, 60% and 80% of the second coating layer from the side of the first coating layer to the side opposite thereto, a Cu content increases and a Ni content decreases;
an average thickness of the first coating layer is not less than 1.0 μm and not more than 6.0 μm; and
an average thickness of the second coating layer is not less than 9.5 μm and not more than 24.0 μm.
2. The friction material according to claim 1, wherein the first coating layer contains not less than 1 atom % and not more than 45 atom % of Cu, not less than 1 atom % and not more than 45 atom % of Ni, and not less than 10 atom % and not more than 95 atom % of Fe.
3. The friction material according to claim 2, wherein the second coating layer contains not less than 5 atom % and not more than 60 atom % of Cu, not less than 40 atom % and not more than 95 atom % of Ni, and not less than 0 atom % and less than 10 atom % of Fe.
4. The friction material according to claim 3, wherein, in the second coating layer, from the side of the first coating layer to the side opposite thereto, in three sections comprising a section from the position at which the thickness is 20% of the second coating layer to the position at which the thickness is 40% of the second coating layer, a section from the position at which the thickness is 40% of the second coating layer to the position at which the thickness is 60% of the second coating layer, and a section from the position at which the thickness is 60% of the second coating layer to the position at which the thickness is 80% of the second coating layer, a rate of the Cu content increased and a rate of the Ni content decreased are each within 20 atom %.

5. The friction material according to claim 4, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

6. The friction material according to claim 3, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

7. The friction material according to claim 2, wherein, in the second coating layer, from the side of the first coating layer to the side opposite thereto, in three sections comprising a section from the position at which the thickness is 20% of the second coating layer to the position at which the thickness is 40% of the second coating layer, a section from the position at which the thickness is 40% of the second coating layer to the position at which the thickness is 60% of the second coating layer, and a section from the position at which the thickness is 60% of the second coating layer to the position at which the thickness is 80% of the second coating layer, a rate of the Cu content increased and a rate of the Ni content decreased are each within 20 atom %.

8. The friction material according to claim 7, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

9. The friction material according to claim 2, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

10. The friction material according to claim 2, wherein an average thickness of the coating layer is not less than 10.5 μm and less than 30.0 μm.

11. The friction material according to claim 1, wherein the second coating layer contains not less than 5 atom % and not more than 60 atom % of Cu, not less than 40 atom % and not more than 95 atom % of Ni, and not less than 0 atom % and less than 10 atom % of Fe.

12. The friction material according to claim 11, wherein, in the second coating layer, from the side of the first coating layer to the side opposite thereto, in three sections comprising a section from the position at which the thickness is 20% of the second coating layer to the position at which the thickness is 40% of the second coating layer, a section from the position at which the thickness is 40% of the second coating layer to the position at which the thickness is 60% of the second coating layer, and a section from the position at which the thickness is 60% of the second coating layer to the position at which the thickness is 80% of the second coating layer, a rate of the Cu content increased and a rate of the Ni content decreased are each within 20 atom %.

13. The friction material according to claim 12, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

14. The friction material according to claim 11, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

15. The friction material according to claim 11, wherein an average thickness of the coating layer is not less than 10.5 μm and less than 30.0 μm.

16. The friction material according to claim 1, wherein, in the second coating layer, from the side of the first coating layer to the side opposite thereto, in three sections comprising a section from the position at which the thickness is 20% of the second coating layer to the position at which the thickness is 40% of the second coating layer, a section from the position at which the thickness is 40% of the second coating layer to the position at which the thickness is 60% of the second coating layer, and a section from the position at which the thickness is 60% of the second coating layer to the position at which the thickness is 80% of the second coating layer, a rate of the Cu content increased and a rate of the Ni content decreased are each within 20 atom %.

17. The friction material according to claim 16, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

18. The friction material according to claim 1, wherein:
the coating layer comprises a third coating layer formed on a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

19. The friction material according to claim 18, wherein the third coating layer contains not less than 30 atom % and not more than 69.5 atom % of Cu, not less than 30 atom % and not more than 69.5 atom % of Ni, and not less than 0.5 atom % not more than 6 atom % of Sn and/or Zn.

20. The friction material according to claim 1, wherein an average thickness of the coating layer is not less than 10.5 μm and less than 30.0 μm.

* * * * *